US007639725B1

(12) United States Patent
Wilson et al.

(10) Patent No.: US 7,639,725 B1
(45) Date of Patent: Dec. 29, 2009

(54) SYSTEM AND METHOD FOR MULTI-PHASE COMPOSITE PN CODE GENERATION

(76) Inventors: Michael L. Wilson, 4635 S. 2930 W., #138, West Valley City, UT (US) 84119; Merle L. Keller, 575 Morton Dr., Salt Lake City, UT (US) 84037; Vaughn L. Mower, 1351 E. Canyon Creek Dr., Bountiful, UT (US) 84010; Kent R. Bruening, 10068 S. Granite Crest La., Sandy, UT (US) 84092

( * ) Notice: Subject to any disclaimer, the term of this patent is extended or adjusted under 35 U.S.C. 154(b) by 978 days.

(21) Appl. No.: 10/811,006

(22) Filed: Mar. 26, 2004

(51) Int. Cl.
*H04B 1/69* (2006.01)
*H04B 1/707* (2006.01)

(52) U.S. Cl. .................................. 375/130; 375/141
(58) Field of Classification Search ................ 375/130, 375/140–150, 152, 367; 370/320, 335, 342, 370/441; 708/250, 252, 253
See application file for complete search history.

(56) References Cited

U.S. PATENT DOCUMENTS

| 4,225,935 | A | * | 9/1980 | Zscheile et al. | 708/253 |
| 4,638,494 | A | * | 1/1987 | Kartchner et al. | 375/367 |
| 5,022,049 | A | * | 6/1991 | Abrahamson et al. | 375/130 |
| 5,257,282 | A | * | 10/1993 | Adkisson et al. | 708/253 |
| 6,735,239 | B1 | * | 5/2004 | Niegel et al. | 375/140 |
| 7,321,609 | B1 | * | 1/2008 | Keller et al. | 375/147 |
| 2002/0013797 | A1 | * | 1/2002 | Jha et al. | 708/250 |
| 2002/0181558 | A1 | * | 12/2002 | Ogawa et al. | 375/147 |
| 2004/0057505 | A1 | * | 3/2004 | Valio | 375/148 |
| 2005/0083901 | A1 | * | 4/2005 | Kim et al. | 370/342 |

* cited by examiner

*Primary Examiner*—Don N Vo

(57) ABSTRACT

A phase division multiple access (PDMA) system is provided. The PDMA system includes at least one receiver logic combiner adapted to generate a plurality of composite PN codes. Each of the plurality of composite PN codes are derived from a common composite PN code and are separated by a predetermined PN phase.

11 Claims, 3 Drawing Sheets

SYSTEM AND METHOD FOR MULTI-PHASE COMPOSITE PN CODE GENERATION

CROSS-REFERENCE TO RELATED APPLICATIONS

This application is related to copending Non-provisional U.S. patent application Ser. No. 10/058,669, filed Jan. 28, 2002. The disclosure of this Non-provisional Patent Application is incorporated by reference herein in its entirety to the extent it does not conflict with the teachings presented herein.

This application is related to copending Non-provisional U.S. patent application Ser. No. 10/242,146 filed Sep. 11, 2002. The disclosure of this Non-provisional Patent Application is incorporated by reference herein in its entirety to the extent it does not conflict with the teachings presented herein.

This application is related to copending Non-provisional U.S. patent application Ser. No. 10/675,185 filed Sep. 30, 2003. The disclosure of this Non-provisional Patent Application is incorporated by reference herein in its entirety to the extent it does not conflict with the teachings presented herein.

BACKGROUND OF THE INVENTION

1. Field of the Invention

The present invention relates to spread spectrum (SS) communication systems using Pseudo-Noise (PN) coding techniques and, more particularly, to generating PN code phases in code division communications systems.

2. Prior Art

Spread spectrum (SS) systems, which may be Code Division Multiple Access (CDMA) systems, are well known in the art. SS systems can employ a transmission technique in which a pseudo-noise (PN) PN-code is used as a modulating waveform to spread the signal energy over a bandwidth much greater than the signal information bandwidth. At the receiver the signal is de-spread using a synchronized replica of the PN-code.

In general, there are two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the carrier frequency and $R_c$ represents the PN-code chip rate, which in turn may be an integer multiple of the symbol rate $R_s$. Multiple access systems employ DSSS techniques when transmitting multiple channels over the same frequency bandwidth to multiple receivers, each receiver sharing a common PN code or having its own designated PN-code. Although each receiver receives the entire frequency bandwidth, only the signal with the receiver's matching PN-code will appear intelligible; the rest appears as noise that is easily filtered. These systems are well known in the art and will not be discussed further.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time a PN generator feeds a frequency synthesizer a sequence of n chips that dictates one of 2n frequency positions. The receiver follows the same frequency hop pattern. FHSS systems are also well known in the art and need not be discussed further.

In general, although the original data stream is recovered, after PN acquisition, the actual data cannot be recovered, or extracted from the data stream until data-symbol boundaries are identified. Data-symbol boundaries are identified either with a symbol synchronizer (bit synchronizer, with its attendant acquisition and pull-in time), or with PN code epochs (i.e., PN code phase).

A DSSS communication element requires its locally generated PN code to substantially match the intended, or received, composite code phase as indicated by its local counters and registers. Thus, a Direct Sequence Spread Spectrum communication element needs to know if its local version of the PN code is at the same phase as the rest of the network. As networks become more complex, and low latency becomes more important, less time must be spent in acquiring lost PN sequence timing. The first advantage of this method is that it produces a set of long codes with favorable autocorrelation properties. The MOD version of these composite codes have no autocorrelation, except where they perfectly align. Another advantage is that many functionally independent codes can be generated with the same set of hardware.

The main advantage of this method for producing multiple codes is that any user can switch to a new code while maintaining lock on all sequences. Since the same set of hardware is producing all the codes, the user in the network synchronized to one code is synchronized to every code. By switching to another code phase combination, the user can transmit or receive any code in the network instantly and then switch back to any other code phase.

SUMMARY OF THE INVENTION

The foregoing and other problems are overcome, and other advantages are realized, in accordance with the presently preferred embodiments of these teachings.

In accordance with one embodiment of the present invention, a Phase Division Multiple Access (PDMA) system is provided. The PDMA system includes at least one receiver logic combiner adapted to generate a plurality of composite PN codes. Each of the plurality of composite PN codes are derived from a common composite PN code and are separated by a predetermined PN phase.

The invention is also directed towards a method for generating multi-phase composite pseudo-noise (PN) codes. The method includes generating a first composite PN code; and generating a second composite PN code. The second and first PN composite codes are derived from common relatively prime component PN codes and are PN phase separated by a suitable PN phase.

In accordance with another embodiment of the present invention an integrated circuit (IC) is provided. The IC includes at least three receiver pseudo-noise (PN) component code generators $PN_x$, $PN_y$, $PN_z$, wherein each PN component code generator is adapted to generate relatively prime PN component codes when compared with each of the other PN component code generators. The IC further includes a PN phase delayer $Z_d$ coupled to one of the at least three receiver PN component generators; and a receiver logic combiner coupled to the at least three receiver pseudo-noise (PN) component code generators $PN_x$, $PN_y$, $PN_z$, and the PN phase delayer $Z_d$. The receiver logic combiner is adapted to generate a plurality of composite PN codes separated by a PN phase determined by PN phase delayer $Z_d$.

The invention is also directed towards a program storage device readable by a machine, tangibly embodying a program of instructions executable by the machine to perform a method for generating multi-phase composite pseudo-noise (PN) codes. The method includes generating a first composite PN code, wherein generating the first composite PN code consists of combining a plurality of relatively prime PN component codes. The method also includes generating a second composite PN code with PN phase separated from the first composite PN code. Generating the second composite PN code includes PN phase delaying one of the plurality of relatively prime PN component codes and then combining the plurality of relatively prime PN component codes.

BRIEF DESCRIPTION OF THE DRAWINGS

The foregoing aspects and other features of the present invention are explained in the following description, taken in connection with the accompanying drawings, wherein.

DETAILED DESCRIPTION

As disclosed herein, the present invention describes a novel method and system for using a single set of PN sequence generators to generate multiple phases of pseudonoise (PN) composite sequences. Component code phases are selected such that the composite code phases can be determined and are suitably phase displaced from other composite code phases to function as independent sequences to the communications system. Multiple users in a communications network can therefore be assigned independent phase sequences for use in CDMA, (Code Division Multiple Access), and other multi-access techniques. It will be appreciated that the advantage of generating multiple sequences by this means is that a single PN code generator is used to generate all the phases of the codes used in the network, and all of the codes are synchronized. If a user is transmitting or receiving on any one of the codes, the user can switch to any of the other codes by selecting a different combination of component code phases in the sequence combining logic.

Figure 1:
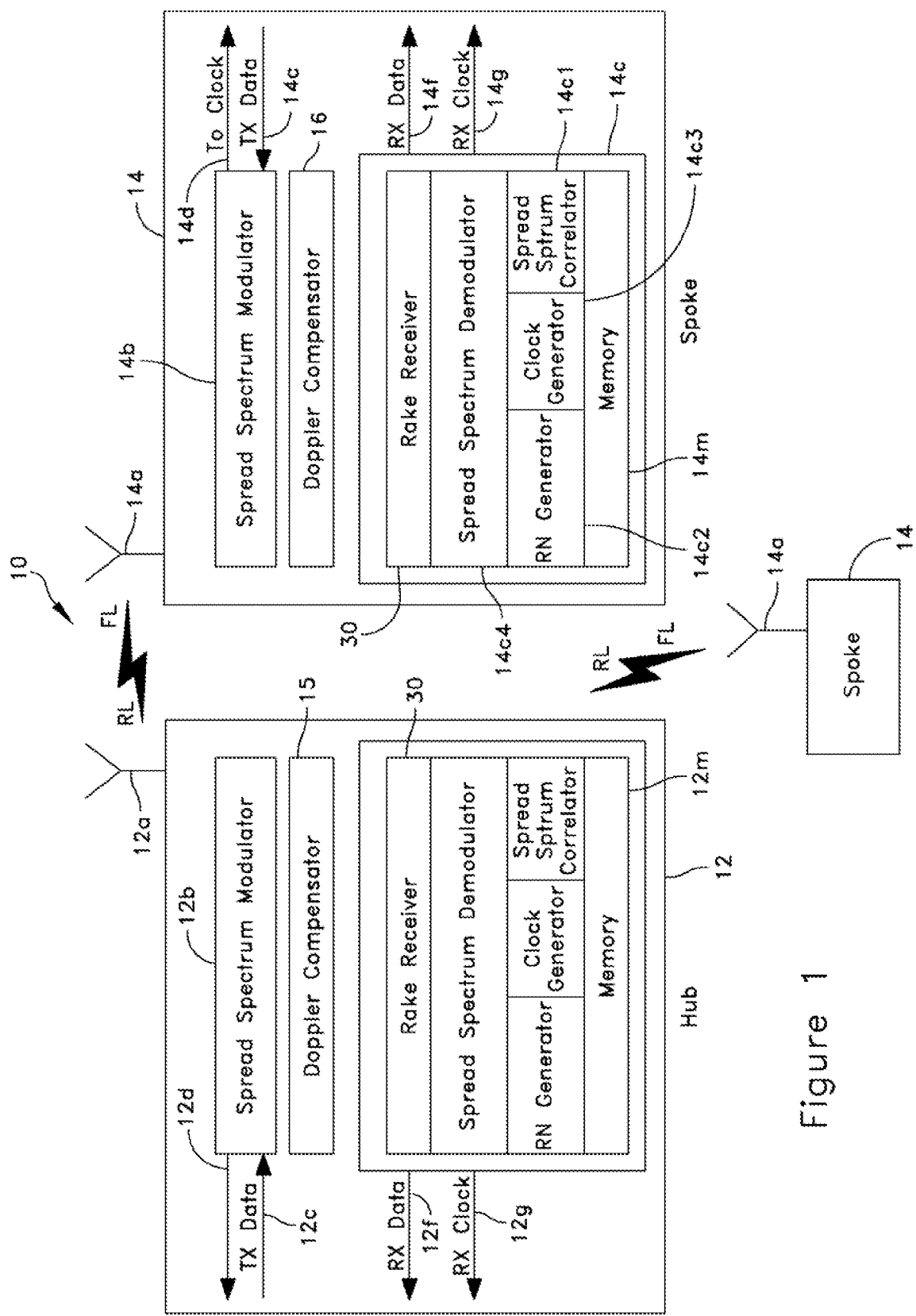
FIG. 1 is a pictorial diagram of a Phase Division Multiple Access (PDMA) system incorporating features of the present invention shown in FIGS. 1-5.

Referring to FIG. 1, there is shown a pictorial diagram of a telecommunications network 10 incorporating features of the present invention. Although the present invention will be described with reference to the embodiment shown in the drawings, it should be understood that the present invention might be embodied in many alternate forms of embodiments, e.g., point-to-point duplex links or point-to-multipoint links. In addition, it should be understood that the teachings herein may apply to any group or assembly of hybrid TDMA-SS receivers, including those that are fixed in place; vehicle mounted; and/or hand carried. As will be made clear, the invention includes waveform structure, link maintenance, and rapid signal acquisition.

Users in a hub 12 and spoke 14 of network 10 may be separated by TDMA, (Time Division Multiple Access) (TDMA is know in the art and will not be discussed here), except that each spoke 14 also has a priority channel, which is separated from assigned TDMA slots, by CDMA. Since the a spoke's transmit code is already being tracked by the hub 12, a spoke 14 user transmits on the priority channel by selecting a secondary phase of the composite PN code, and transmitting on that code. Since the hub 12 is synchronized to the primary code phase, it is rapidly locked to the secondary code phase. The receiver in the hub 12 can select both the primary code and the priority code and demodulate both of the signals near simultaneously. Additionally, if the return link code from the spokes 14 is also a phase of the transmit code, each of the spokes 14 can maintain synchronization in the reverse direction by tracking the hub 12 and making the corrections for Doppler or range.

Still referring to FIG. 1, there is shown a full-duplex system 10 that is suitable for practicing this invention. Specifically, the system 10 employs direct sequence spread spectrum based techniques over an air link to provide data transfer between HUB 12 and a SPOKE 14. It will be appreciated that there may be more than one Spoke 14. The forward link (FL) from HUB 12 to SPOKE 14 contains a spread spectrum waveform that is constructed in the manner described herein, with the PN code being composed of relatively prime even-length and/or maximal length codes. In a similar manner, the return link (RL) from SPOKE 14 to HUB 12 contains a spread spectrum waveform that is similar, or identical, to that of the FL.

As shown in FIG. 1, HUB 12 includes a Spread Spectrum Modulator (SSM) 12b; the SSM 12b generates a desired spread spectrum waveform at a desired RF frequency. The SSM 12b also provides a Tx clock 12d that is used to clock the Tx Data 12e into the SSM 12b. The SSM 12b then combines the Tx data 12e with a spread spectrum PN code to produce the desired spread spectrum waveform. HUB 12 also includes an antenna 12a, which may transmit at any suitable RF frequency.

The signal generated by HUB 12 and transmitted by antenna 12a via the FL is received by SPOKE 14 via antenna 14a. Spoke 14 includes a spread spectrum correlator 14c1, PN generator 14c2, clock generator 14c3, and spread spectrum demodulator (SSD) 14c4. The received signal is then demodulated by SSD 14c4, and PN phase is maintained in accordance with features of the present invention described herein. It will be appreciated that all or partial demodulation functions may be contained within an integrated circuit (IC) such as a Field Programmable Gate Array (FPGA). Once the signal is acquired and the SPOKE 14 is tracking the received signal, the Rx Clock 14g and Rx Data 14f are output to the intended receiver circuitry. It will be appreciated that the clocks 14g and 12d are synchronous and may be commanded to change frequency to correspond with PN code epochs as will be described herein; thus advantageously providing means to vary the data rate without interruption; and without the need for conventional bit synchronizers with associated synchronization time.

Similarly, SPOKE 14 generates a Tx Clock 14d and Tx Data 14e using the Spread Spectrum Modulator 14b in a similar fashion described earlier for a HUB. Likewise, HUB 12 may receive the RL signal via antenna 12a, and demodulate and track the signal as described earlier with receiver 12c to provide Rx Data 12f and Rx Clock 12g to the intended user.

As noted earlier, spread spectrum "spreading" codes are used in CDMA to allow multiple users to operate in the same frequency band by isolating the users with either an orthogonal or uncorrelated spreading sequence for each user.

Very long spreading codes, which in some cases can last hours or days before repeating the code sequence, are desirable because they are resistant to interception. Unless other information is provided, the receiver may need to search the full length of the code sequence before finding the proper phase in order to acquire signals that have been encoded or "spread" by the spreading code. Thus, signal acquisition could be prohibitively long.

However, in a CDMA system, the PN codes used for multiple users must have codes that do not cross correlate. Thus, the PN codes must be either independent or orthogonal sequences. If the composite sequence is very long, then using a second phase with a suitable phase offset will appear as an independent sequence. It will be appreciated that features of the present invention allow for multiple phase outputs of the composite sequence, each with a suitable phase offset.

Figure 2:
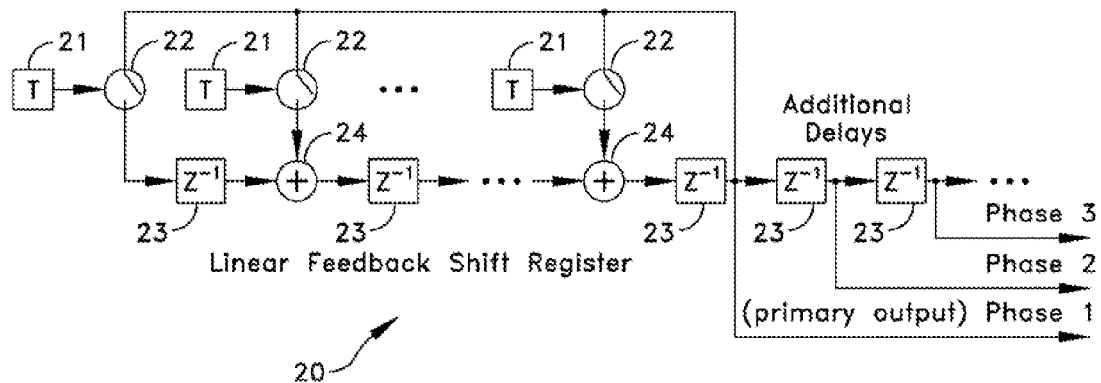
FIG. 2 is a diagram of one component code generator with multiple phase outputs in accordance with the teachings of the present invention.

Thus the present invention can produce multiple phases of the composite PN sequence with large phase offsets such that the each of the output PN sequences will appear independent to the communications network. For example, referring to FIG. 2 there is shown a linear feedback shift register (LFSR) 20 consisting of switches 22, taps 21, summers 24, and 1-chip delayers 23 outputting a primary phase of the PN code. LSFRs are well known and need not be discussed here. The feedback taps 21 on the shift register are loaded with a primitive polynomial to produce a maximal length sequence. FIG. 2 shows a preferred method of the addition of extra 1-chip delays 23, each outputting a different phase of the same PN code.

Composite spreading codes, consisting of MAND and MAJ combined component spreading codes described herein and as in U.S. Pat. No. 5,598,154 by Wilson et al., Jan. 28, 1997, the contents of which are incorporated herein by reference in its entirety to the extent that it does not conflict with the teachings contained herein, have partial correlation properties. Partial correlation properties allow a receiver to search for the phase of each of the component codes individually, rather than the full sequence. The search time is then the sum of the component code lengths, rather than the product of the component code lengths.

Partial correlation also allows 'data aided search', in which once partial correlation is found, low rate data describing composite phase information can be passed to the receiver. Once the receiver has locked on to the correct phase of each of the component codes X, Y, and Z, the transmitter can change to the MOD, which has no partial correlation properties, verses the MAND sequence.

Referring to U.S. Pat. No. 5,598,154 by Wilson et al., Jan. 28, 1997. This patent describes how the same X, Y, & Z codes can be combined to produce orthogonal and independent composite sequence. In this case, a second phase of the Y and Z PN code is used to produce independent MOD codes for the I and Q channel. It will be appreciated that by creating multiple phase outputs from each of the component sequences, multiple phases of the composite sequence can be produced. A pair of composite code phases is used to produce a code for both I and Q. Each pair of composite code phases can be combined to produce a composite I and Q code. This applies to the MOD, MAND, and MAJ versions of the codes.

Code phases of the component codes can be selected to produce the desired code phase of the composite code. In copending Non-provisional U.S. patent application Ser. No. 10/675,185 it is shown that phase offsets in the composite sequence can be produced by slipping the component codes by very small amounts. In an example of a 2047/4095/8191 PN composite code, the length is 68,660,770,815 chips. By selecting another combination where the Y-code is advanced by 1 chip relative to the X and Z codes, the resulting code phase of the composite code will be advanced by 68,627,236, 860 chips, a phase difference of 33,533,954 chips. A code slip in this paper is the same as a phase offset of a component code by the same amount. Using this method, combining various phases of the component codes produces a known phase offset for the composite sequence.

When determining how large the phase offsets of the composite code must be such that they are effectively independent, some factors are preferably considered. For example, a one chip offset in one of the component codes will produce a phase offset in the composite code equal to at least one combination epoch of the codes not slipped. One example of code implementations is of a $2^{12}$, $2^{16}-1$, and $2^{17}-1$ length component codes, which produces a composite PN code length greater than $30 \times 10^{12}$. Thus, it is an advantage of the present invention to generate multiple phases with phase offsets many orders of magnitude greater than tens of thousands, or even millions of chips. Therefore the phase offsets between PN composite code sequences produced by this invention are sufficient to appear as independent codes to the communications network.

Relative Primeness

Relatively prime component codes constructed in accordance with features of the present invention do not share multiplicands of their code lengths. As an example, a PN code may be comprised of three component codes: X, Y, and Z. The length of X is 12 chips (2×2×3 are the multiplicands of 12). The length of Y is 315 chips (5×7×9), and the length of the Z component code is 601, a prime number. Although the component code lengths of 12 and 315 are not prime, they are relatively prime in that they do not share multiplicands. It will be appreciated that any suitable number of relatively prime component codes may be used.

It will be further appreciated that any suitable method for combining component codes and generating local epoch symmetrical composite PN codes may be used. It will be further appreciated that in embodiments using more than three component codes; for example, four component codes; the component codes (X, Y, Z1, and Z2) may be MAND combined $X \oplus (Y \cdot (Z1 \oplus Z2))$, meaning X xor Y AND Z1 xor Z2, (where AND refers to AND-Boolean logic). In the preferred embodiment, one of the PN codes to the left of the AND in the MAND code is assigned to be an even-length code with special auto correlation properties. In alternate embodiments, any of component codes could be assigned to be a suitable length with suitable autocorrelation properties. In addition, a MAND composite code composed of four component codes in accordance with the teachings of the invention has partial correlation properties with its X, Y, and/or (Z1⊕Z2) component codes. For example, when a MAND code is mixed (or correlated) by the receiver with an exact copy of its X code, and the X code is aligned (in phase) with the MAND code, the MAND PN encoded data is recovered, albeit the recovered signal has ¼ the power than if full correlation were achieved. Thus, by acquiring, in accordance with the teachings of the invention, an even-length code first, symbol synchronization [of even or odd length] can be achieved independent of symbol synchronizers, and a partial correlation allows the recovery of encoded or unencoded data from the received signal. It will be further appreciated that in 4-component code systems the components may be MAJ combined codes. MAJ for a 4-component-code sequence:

$$X, Y, Z1, \text{AND } Z2: \text{MAJ}=(X \cdot Y) \oplus (X \cdot Z1) \oplus (X \cdot Z2) \oplus (Y \cdot Z1) \oplus (Y \cdot Z2) \oplus (Z1 \cdot Z2)$$

Figure 3:
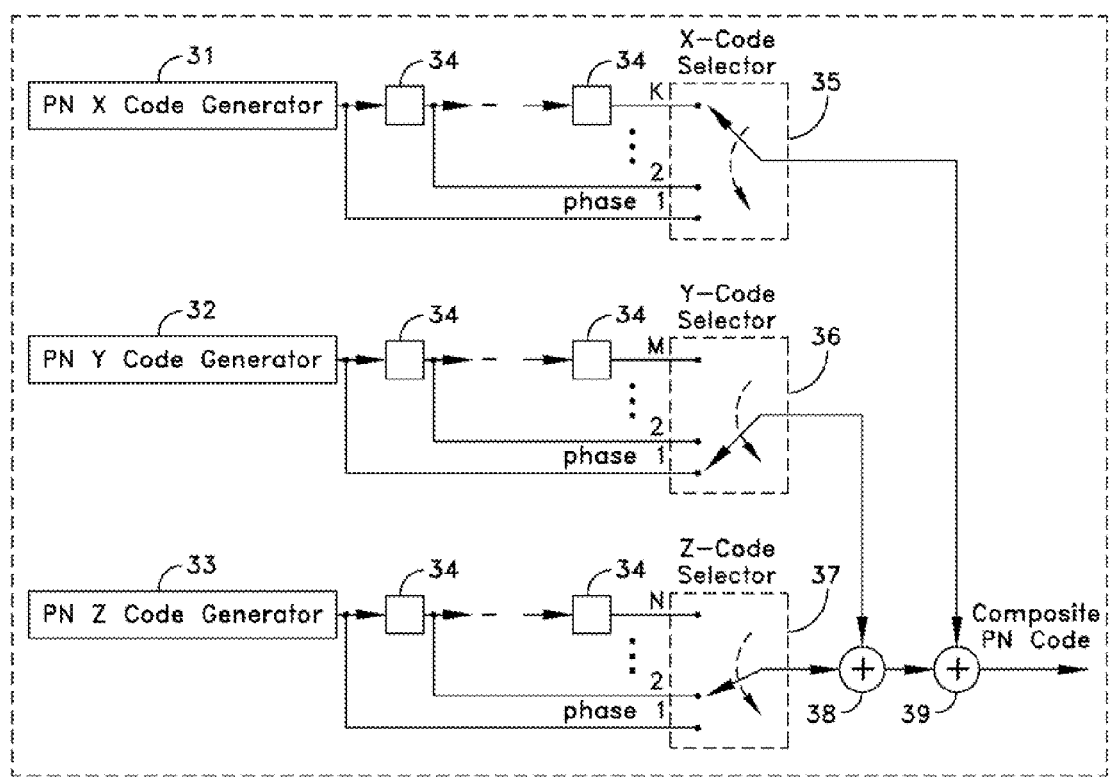
FIG. 3 is a diagram illustrating multi-phase composite MOD code combination using three component codes in accordance with teachings of the present invention.

When combining multiple sequences with relatively prime lengths, the composite code has a length that is the product of the component sequences. If a different phase of one of the component sequences is used in the combination, the resulting composite sequence will be a different phase of the same sequence. The composite code phase offset produced by using a different phase of one of the component sequences will be at least the combined length the remaining component sequences. In other words, with an X, Y, and Z code, if a 1-chip or more phase offset is used from say the X code, the composite code phase will be offset by at least the product of the Y and Z lengths. Additional phases can be tapped off of any of the component codes, and those phases used to make a new phase of the composite code. This is shown in FIG. 3. In general, any number of additional phase delays may be added, up to the length of the code. However, a practical implementation would limit the number of taps to produce the desired number of code phases required for the multi-user environment. Additionally, only code phases with large separation are desirable when independent codes are needed. This may be an issue if the component sequences are short relative to producing composite code phases that appear as independent sequences.

One phase selection from each of the component codes is combined to form a phase of the composite code. Selections can be made from the multiple phases provided from each of the component codes. The number of possible composite codes phases that are selectable is the product of the phases available from each component code.

Referring to FIG. 3 there is shown a modulo-2 combination of three component codes generated by generators 31,32, and 33. The generators may be LSFR generators or any suitable PN component code generators. FIG. 3 also shows PN phase delayers 34 and PN component code phase selectors 35,36, and 37, coupled to the generators and associated phase delayers 34. In general, selectors 35,37, and 37 may select any suitable number of multiple phase delay taps. Summers 38, 39, modulo-2 combine outputs of selectors 36,37, and outputs of summer 38 and selector 35, respectively.

Still referring to FIG. 3, there is shown a composite code using the three codes, referred to as the X, Y, and Z codes. The combination shown is modulo-2, also referred to as the MOD code. It will be appreciated that other combinatorial logic, e.g., MAND combinatorial logic, may also be used. It is also possible to get the additional code phases by tapping off internally to the linear feedback shift register, rather than adding extra delays to the output. This will be discussed herein with respect to FIG. 5.

Figure 4:
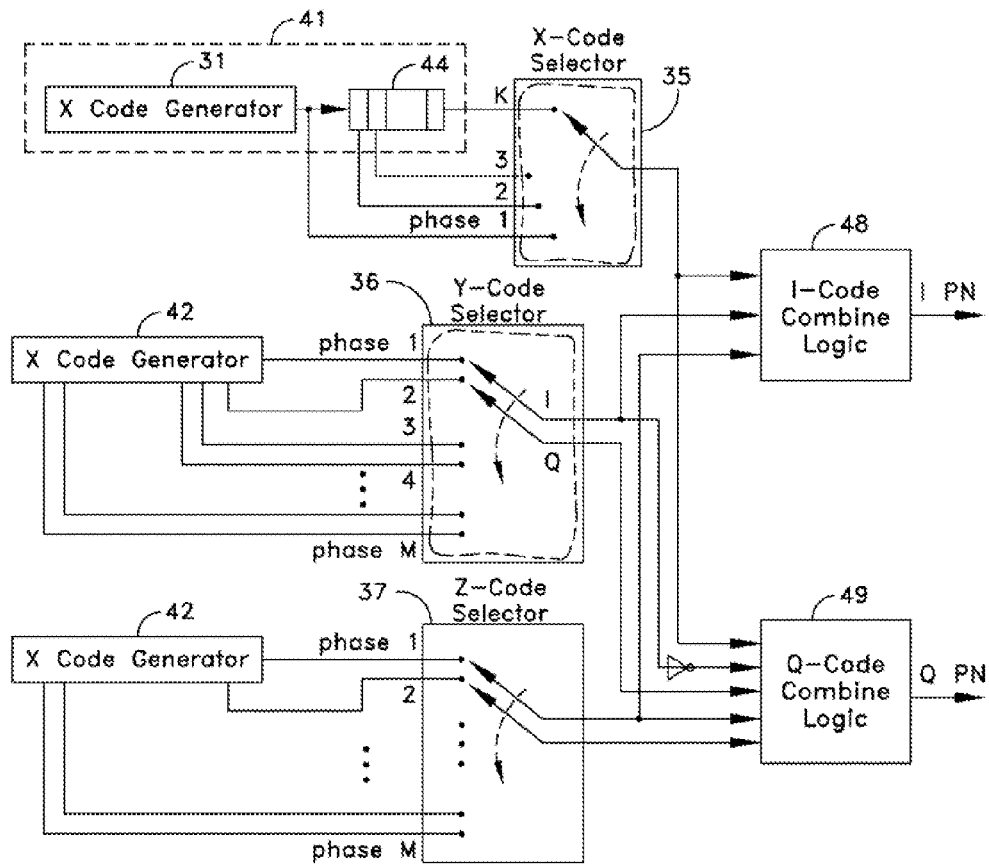
FIG. 4 is a diagram illustrating code combining for multi-phase I and Q signals in accordance with teachings of the present invention.

Referring to FIG. 4, when I and Q coded signals are required, two phases are used at a time from the Y and Z generators shown in FIG. 4 to produce the I and Q sequences.

Figure 5:
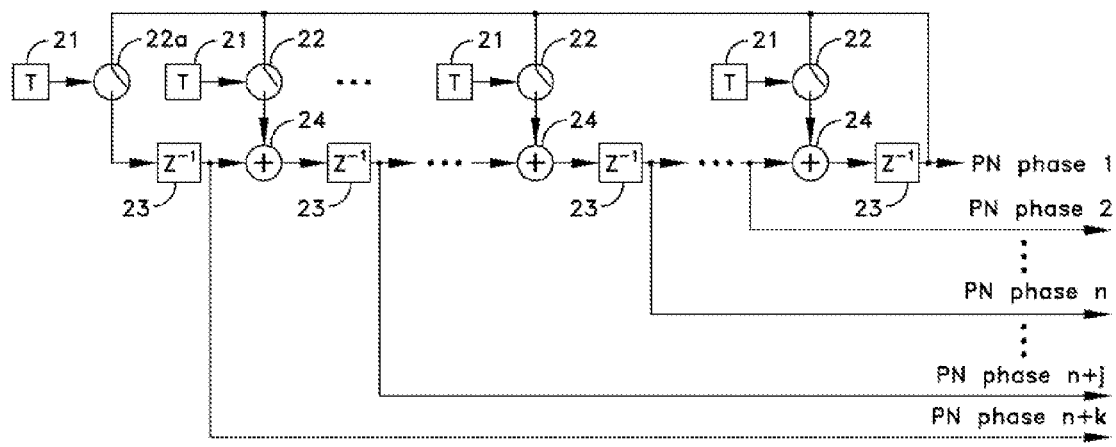
FIG. 5 is a diagram illustrating an optional embodiment of the present invention to obtain multiple phase outputs.

The block diagram in FIG. 4 shows the code combine logic for generating multi-phase I and Q PN codes. Referring to FIG. 4, there is shown X, Y, and Z generators, 41, 42, and 43, respectively. The X, Y, and Z generators, 41, 42, and 43 may be any suitable PN component code generators such as, but not limited to LSFR generators. FIG. 4 shows that multiple phases from X, Y, and Z generators, 41, 42, and 43, respectively, are selectable. If fewer composite code phases are required in a given application, fewer of the component code generators need multiple phases. FIG. 4 shows a mixture of methods for obtaining extra phases, either of which can be used. One exception to this is the X code generator 41. In some applications an extra "0" is inserted into the X PN code to produce an even length code. When the X code is used in this way, multiple taps from the X code generator must only be obtained by adding the extra delays on the output of the generator, after the "0" insertion as shown by X-code generator 31 and phase delayer 44. When the extra "0" is inserted into the output sequence, it should be noted that this "0" is not feed back into the linear feedback shift register, nor is it desirable to do so. This is also true if a sequence is truncated, extra phases should only be produced by adding delays on the output of the PN generator. Internal phase tapping details in the Y, and Z component code generators 42, and 43 are shown in FIG. 5, as well as in the diagrams from U.S. Pat. No. 5,598,154 by Wilson et al., Jan. 28, 1997. Each of the code selectors 36,37 can choose one pair of output codes from their respective component code generators 42,43. All connections are shown to implement the I and Q code combiners 48,49, respectively. As seen in the diagrams from the patent, an inverted Y code is needed for the Q code and a single phase of the X code for both I and Q.

It will also be appreciated that using the same Z phase on both I and Q provides for additional acquisition schemes. For example, having the 2nd Z phase for Q is backward compatible to existing systems.

FIG. 4 shows a single set of I and Q codes. By routing each of the component code phases to additional sets of code selector and combining logic, multiple I and Q PN codes can also be generated in parallel. This would be the case if a transmitter needed multiple codes to transmit on multiple CDMA channels, or a receiver needed to receive multiple CDMA channels with separate codes. Each set of code select and combine logic would produce a functionally independent code, and each could select code phases independent of the other.

Each possible phase combination will produce a unique composite code phase. The number of composite code phases is the product of the number of phases provided from each component code. Except in the case where an I and Q code are generated, since the code phases are selected in pairs. When selecting phase combinations, a suitable phase offset is produced when a different delay of one of the component codes is used.

An implementation can have as many taps as suitable to produce the number of independent phases for users in the network. Each tap from the linear feedback shift register will produce a different phase of the same component PN code. Each possible combination of X, Y, and Z component code phases will produce a unique composite code phase. In the case of an X, Y, and Z code, the number of possible composite code phase outputs is the product of the number of phases available from each component code.

An alternate method for obtaining additional phase offsets is provided here. In a preferred implementation above, additional delays are added to the output of the complete component PN code generator. When generating maximal length sequences, any other tap of the linear feedback shift register will also produce the same sequence at a different phase. This is shown in FIG. 5.

There are a few items to consider when using this method however. The phase offsets of the component codes are preferably determined as follows. When selecting the taps from the feedback shift register in FIG. 5, if there are no feedback-taps 21 between the primary phase, phase 1, and the secondary phase, phase 2, then the phase offset is equal to the number of registers between the primary output and the secondary phase output. That is if switch 22a is open, then phase 2 will be one chip advanced from phase 1 output. This will not be the case if there is a feedback tap, or in other words, if switch 22a is closed. The resulting phase offset will be larger, and needs to be calculated for each specific primitive polynomial being used. As mentioned above, this method of obtaining additional phases of the component codes will only work when generating maximal length sequences. These taps will not produce the new phases of the correct code when a zero is inserted into the sequence, or if truncated sequences are used.

Advantages of the Multi-Phase PN Code Generator

Generating the multiple codes from the same linear feedback shift registers guarantees that they are always synchronized. Code phase adjustments to the primary composite code will always adjust all of the PN code outputs by the same amount. Although separate feedback shift register sets could be used to generate independent codes, this would require some type of initialization of all the hardware to a known state. As communication networks become more complex, resetting the PN code becomes more disruptive to the network.

Although the examples shown herein use 3 component codes, the method can be applied for any number of component codes: two or greater for MOD codes and greater than two for the specific X, Y, and Z codes and the I and Q orthogonal code scheme. Multiple phases can be used from all or just some of the component code generators, depending on the number of unique phases desired for the application.

It should be understood that the foregoing description is only illustrative of the invention. Thus, various alternatives and modifications can be devised by those skilled in the art without departing from the invention. For example, MOD combinatorial logic, e.g., $X \oplus Y \oplus Z$ or $X \oplus Y \oplus Z1 \oplus Z2$ may be used. Accordingly, the present invention is intended to embrace all such alternatives, modifications and variances that fall within the scope of the appended claims.

An advantage of this invention is that it produces a set of long codes with favorable autocorrelation properties. The MOD version of these composite codes have no autocorrelation, except where they perfectly align. Another advantage is that many functionally independent codes can be generated with the same set of hardware. The main advantage of this method for producing multiple codes, is that any user can switch to a new code while maintaining lock on all sequences. Since the same set of hardware is producing all the codes, the user in the network synchronized to one code is synchronized to every code. By only switching to another code phase combination, the user can transmit or receive any code in the network near instantaneously and then switch back to any other code phase.

It will be further appreciated that the aforementioned IC may be an application specific IC (ASIC), or a function of firmware. A suitable programming language such as a Very High Speed Integrated Circuit (VHSIC) Hardware Description (VHDL) Language file may define the operation of the ICs or firmware.

What is claimed is:

1. A phase division multiple access (PDMA) system, the system comprising:
    at least one receiver logic combiner, the at least one receiver logic combiner adapted to generate a plurality of relatively prime composite PN codes, wherein each of the plurality of composite PN codes are separated by a predetermined PN phase.

2. A PDMA system as in claim 1, further comprising at least three first receiver pseudo-noise (PN) component code generators coupled to the at least one receiver logic combiner, wherein each of the at least three first receiver pseudo-noise (PN) component code generators generate relatively prime PN component codes.

3. A PDMA system as in claim 2 further comprising at least one PN phase delayer coupled to one of the at least three first receiver PN component code generators.

4. A PDMA system as in claim 2 wherein the at least three first receiver pseudo-noise (PN) component code generators comprise four first receiver PN component code generators.

5. A PDMA system as in claim 3 wherein the predetermined PN phase substantially equals a phase offset in the relatively prime composite code substantially equal to at least one combination epoch of the relatively prime PN component codes not slipped.

6. A PDMA system as in claim 1 wherein the receiver logic combiner comprises a MAND logic combiner.

7. A PDMA system as in claim 1 wherein the receiver logic combiner comprises a MAJ logic combiner.

8. A PDMA system as in claim 1 wherein the receiver logic combiner comprises a MOD logic combiner.

9. A program storage device readable by a machine, tangibly embodying a program of instructions executable by the machine to perform method steps for generating multi-phase composite pseudo-noise (PN) codes, the method comprising:
    generating a first composite PN code, wherein generating the first composite PN code comprises:
        generating a plurality of relatively prime PN component codes;
        combining the plurality of relatively prime PN component codes;
    generating a second composite PN code, wherein the second composite code is PN phase separated from the first composite PN code wherein generating the second composite PN code comprises:
        generating the plurality of relatively prime PN component codes;
        PN phase delaying one of the plurality of relatively prime PN component codes; and
        combining the plurality of relatively prime PN component codes.

10. A program storage device as in claim 9 wherein the program of instructions comprise at least one Very High Speed Integrated Circuit (VHSIC) Hardware Description (VHDL) Language file.

11. A phase division multiple access (PDMA) system, the system comprising:
    at least one receiver logic combiner, the at least one receiver logic combiner adapted to generate a plurality of relatively prime composite PN codes, wherein each of the plurality of composite PN codes are separated by a predetermined PN phase;
    at least three first receiver pseudo-noise (PN) component code generators coupled to the at least one receiver logic combiner, wherein each of the at least three first receiver pseudo-noise (PN) component code generators generate relatively prime PN component codes;
    at least one PN phase delayer coupled to one of the at least three first receiver PN component code generators; and
    wherein the predetermined PN phase substantially equals a phase offset in the relatively prime composite code substantially equal to at least one combination epoch of the relatively prime PN component codes not slipped.

* * * * *